UNITED STATES PATENT OFFICE.

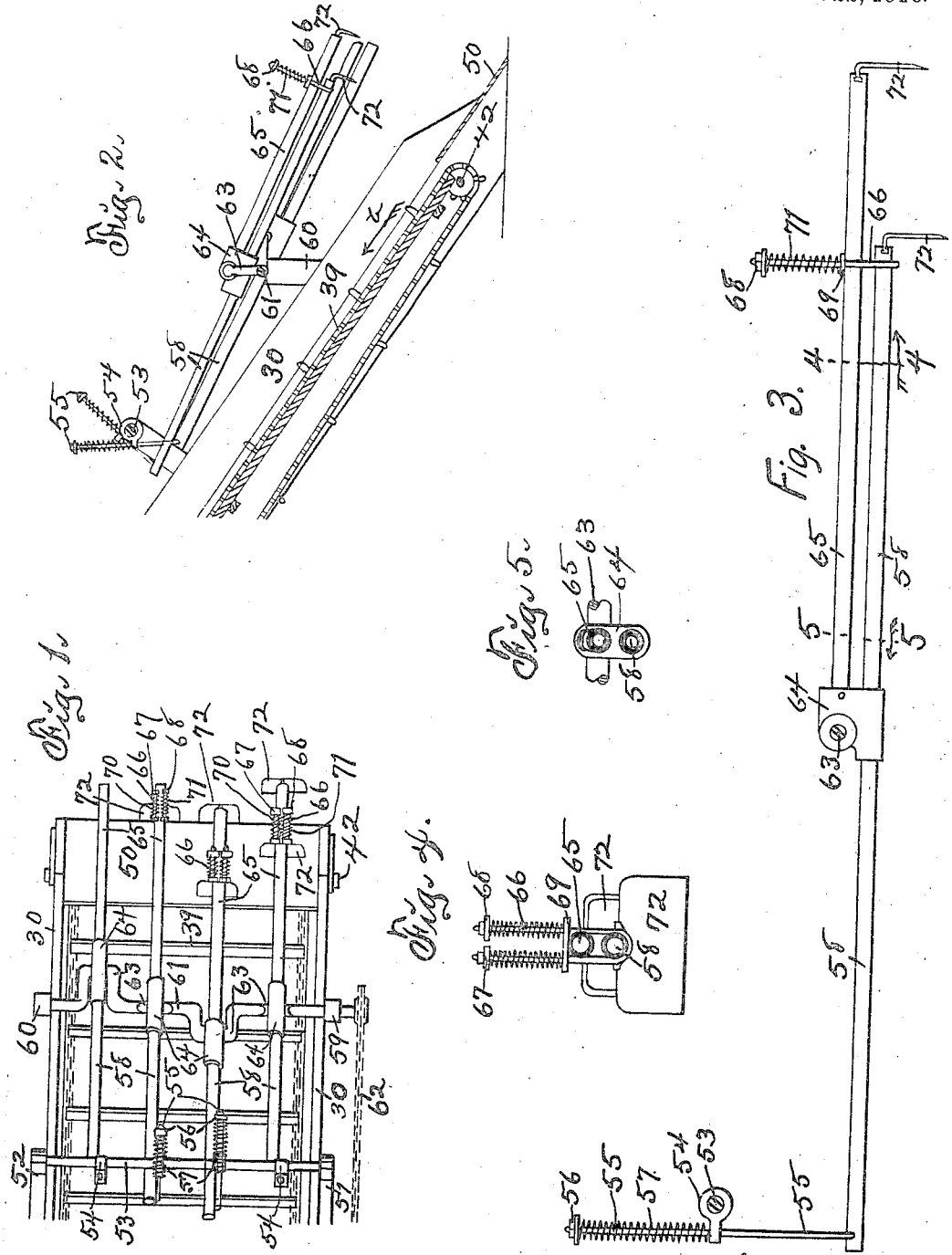

WILLIAM F. BOHLING, OF ARCADIA, AND JULIUS C. BOHLING, OF GLIDDEN, IOWA.

WALKING-RAKE.

976,250.     Specification of Letters Patent.    Patented Nov. 22, 1910.

Original application filed March 8, 1909, Serial No. 482,195. Divided and this application filed November 8, 1909. Serial No. 527,321.

*To all whom it may concern:*

Be it known that we, WILLIAM F. BOHLING and JULIUS C. BOHLING, citizens of the United States, the former residing at Arcadia and the latter at Glidden, both in the county of Carroll and State of Iowa, have invented a new and useful Walking-Rake, of which the following is a specification.

The object of this invention is to provide improved gathering devices or walking-rake mechanism adapted to gather and convey substance, such as manure, to and upon an elevator:

A further object of this invention is to provide improved means for cushioning walking-rake mechanism.

Our invention consists in the construction, arrangement and combination of elements hereinafter set forth, pointed out in our claims and illustrated by the accompanying drawing, in which—

Figure 1 is a plan of a portion of an elevator frame and elevator therein showing our improved mechanism mounted thereon for use in conjunction with said elevator. Fig. 2 is a side elevation of the same. Fig. 3 is a longitudinal section, on an enlarged scale, on the indicated line 3—3 of Fig. 1. Fig. 4 is a cross-section, on an enlarged scale, on the indicated line 4—4 of Fig. 3. Fig. 5 is a cross-section, on an enlarged scale, on the indicated line 5—5 of Fig. 3.

The mechanism hereinafter described and claimed is illustrated and described and has been divided out of our joint application for Letters Patent of the United States filed March 8, 1909 and serially numbered 482,195, to which reference hereby is made.

In the construction of the mechanism as shown the numeral 30 designates an elevator frame which may be supported in any desired manner. A drag conveyer 39 is mounted in the frame 30 and arranged for travel of its upper portion rearwardly and upwardly as indicated by the arrow *b* in Fig. 2. The drag conveyer 39 is supported and guided in its lower portion by a shaft 42 journaled in and transversely of the frame 30. A scraper blade 50 is mounted transversely of and projects beyond the lower forward end of the elevator frame 30. The scraper blade is inclined and has its rear upper margin overlapping the conveyer 39. Brackets 51, 52 are fixed to and project upwardly from central portions of the elevator frame 30 opposite each other and a rod 53 connects the upper ends of said brackets and extends across said frame. Bearings 54, in this instance four in number, are mounted loosely on the shaft 53 and project rearwardly therefrom. Rods 55, in this instance four in number, are mounted loosely through rearwardly projecting portions of the bearings 54 and extend across the shaft 53. The upper end portions of the rods 55 are threaded to receive nuts 56 and expansive coil springs 57 are mounted on said rods between, and at their opposite ends impinge said nuts and the bearings 54. Arms 58, in this instance four in number, are pivoted at their rear ends to the lower ends of the rods 55 and extend downward and forward therefrom above the conveyer 39 and scraper blade 50. The arms 58 are spaced throughout the width of the conveyer 39.

Brackets 59, 60 are fixed to and rise from the forward end portions of the sides of the elevator frame 30 and a shaft 61 is journaled to said brackets and is driven, preferably by sprocket gearing 62, from a prime mover not shown. The shaft 61 is formed with a plurality of cranks, in this instance four in number, set quartering relative to each other, between its bearings and collar bearings 64, also four in number, are mounted loosely on said cranks. The arms 58 extend through the collar bearings 64 beneath and at right angles to the shaft 61. Extension arms 65, also four in number, are mounted at their rear ends in and pivoted to the collar bearings 64 and extend forward and parallel with and above the arms 58 to points beyond the forward ends of the latter arms. Yokes 66, also four in number, extend beneath and embrace pairs of the arms 58, 65 adjacent to the forward ends of the first arms. End portions of the yoke 66 are threaded to receive nuts 67, 68. A bar washer 69 is mounted on the arms of each yoke 66 and engages the upper surface of an arm 65. Expansive coil springs 70, 71 are mounted on the arms of the yokes 66 between and impinging the bar washer 69 and the nuts 67, 68 respectively. The spring-held yokes 66 provide a resilient connection between the forward ends of the arms 58, 65 and said arms 65 may oscillate and articulate in the collar bearings 64. The arms 58, 65 preferably are composed of tubing, and gathering devices such as hoes 72, or rakes, are mounted with their stems in and fixed to the forward ends of said bars, the gathering devices, constructed either as hoes or rakes, or partly of one and partly of the other, depending at right angles to and in front of the bars on which they are mounted. The crank shaft 61 is rotated in any desired manner and it is the function of said shaft 61 to oscillate the arms 58 and 65 and cause the gathering devices thereon to engage and drag substances upon and across the scraper blade 50 and upon the drag conveyer 39. The nuts 56 and springs 57 provide means for adjusting the tension of the arms 58 and the nuts 67, 68 and springs 70, 71 provide means for adjusting the tension of the arms 65.

In practical use the machine is advanced slowly to the substance to be removed, such as manure; the scraper blade 50 penetrates beneath the surface to be removed; the gathering devices 72, actuated by the arms on which they are mounted, engage and drag portions of the substance to be removed across the scraper blade 50 and upon the drag conveyer 39; the conveyer 39 carries the substance upwardly and rearwardly and deposits it as desired.

Other forms and constructions of devices may be employed, and we do not limit ourselves to the precise construction and arrangement herein described.

We claim as our invention—

1. In a loading machine, an elevator frame, a conveyer therein, a rod extending transversely of and above said conveyer, arms pivoted at their rear ends side by side to said rod and above said conveyer, said arms extending lengthwise of said conveyer, a multiple crank shaft mounted transversely of said conveyer, bearings loosely mounted on the cranks of said shaft, said arms extending through said bearings beneath said cranks, whereby the crank shaft is adapted to oscillate said arms, and gathering devices on the forward ends of said arms.

2. In a loading machine, a transverse rod, bearings mounted loosely on said rod and projecting rearwardly therefrom, rods extending upwardly through said bearings at the rear of the transverse rod, yielding pressure devices acting on the latter rods and the bearings, arms pivoted at their rear ends to the lower ends of said rods, cranks acting on intermediate portions of said arms, and gathering devices fixed to the forward ends of said arms.

3. In a loading machine, a rod, bearings thereon, hangers in said bearings at the rear of said rod, yielding pressure devices on said hangers above said bearings, arms pivoted to said hangers below said bearings, gathering devices on the opposite ends of said arms, and a crank shaft acting on intermediate portions of and adapted to oscillate said arms.

4. In a loading machine, a hanger mounted for oscillation, a crank shaft, a bearing on said crank shaft, an arm pivoted at one end to said hanger and extending through said bearing, an arm parallel with the first arm and pivoted to said bearing, and gathering devices on the forward ends of said arms.

5. In a loading machine, a hanger mounted for oscillation, a crank shaft, a bearing on said crank shaft, an arm pivoted at one end to said hanger and extending through said bearing, an arm parallel to the first arm and pivoted to said bearing, and gathering devices on the forward ends of said arms, together with resilient yokes connecting said arms.

6. In a loading machine, a hanger mounted for oscillation, a crank shaft, a bearing on said crank shaft, an arm pivoted at one end to said hanger and extending through said bearing, an arm parallel to the first arm and pivoted to said bearing, and gathering devices on the forward ends of the arms, together with resilient yokes connecting said arms, and tension devices on said hangers.

WILLIAM F. BOHLING.
JULIUS C. BOHLING.

Witnesses:
J. C. PRUTER,
D. HAGGE, Jr.